US010705334B2

(12) United States Patent
Kasazumi et al.

(10) Patent No.: US 10,705,334 B2
(45) Date of Patent: Jul. 7, 2020

(54) DISPLAY DEVICE, DISPLAY METHOD AND DISPLAY MEDIUM

(71) Applicant: Panasonic Intellectual Property Management Co., Ltd., Osaka (JP)

(72) Inventors: Ken'ichi Kasazumi, Osaka (JP); Toshiya Mori, Osaka (JP); Hiroaki Okayama, Nara (JP); Satoshi Kuzuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 15/738,645

(22) PCT Filed: Jun. 13, 2016

(86) PCT No.: PCT/JP2016/002831
§ 371 (c)(1),
(2) Date: Dec. 21, 2017

(87) PCT Pub. No.: WO2017/002312
PCT Pub. Date: Jan. 5, 2017

(65) Prior Publication Data
US 2018/0188530 A1    Jul. 5, 2018

(30) Foreign Application Priority Data

Jun. 30, 2015 (JP) .................................. 2015-131926

(51) Int. Cl.
*G09G 3/00* (2006.01)
*G02B 27/01* (2006.01)
(Continued)

(52) U.S. Cl.
CPC .......... *G02B 27/0101* (2013.01); *B60K 35/00* (2013.01); *B60R 11/02* (2013.01);
(Continued)

(58) Field of Classification Search
CPC .... G02B 27/01; G02B 27/00; G02B 27/0101; G09G 3/00; G09G 2320/0257; G09G 2354/00
See application file for complete search history.

(56) References Cited

U.S. PATENT DOCUMENTS 5,013,134 A * 5/1991 Smith ............... B32B 17/10568
345/7
6,414,796 B1 * 7/2002 Muromachi ...... B32B 17/10036
340/980
(Continued)

FOREIGN PATENT DOCUMENTS

DE    102007059323 A1    6/2009
JP         64-038718       2/1989
(Continued)

OTHER PUBLICATIONS

The Extended European Search Report dated May 29, 2018 for the related European Patent Application No. 16817424.1.
(Continued)

*Primary Examiner* — Antonio Xavier
(74) *Attorney, Agent, or Firm* — Greenblum & Bernstein, P.L.C.

(57) ABSTRACT

To provide a display device that can suppress generation of a double image. Display device includes plate-shape windshield having translucency and a projection unit that projects light expressing an image onto windshield such that the light is reflected toward a user by windshield. The projection unit changes a display distance between an eye of the user and a position of an image visually recognized as a virtual image by the user through windshield by the light projection. Windshield is formed such that a wedge angle that is of an angle formed between a front side and a back side at a region located at any level of windshield is continuously decreased with increasing level.

15 Claims, 10 Drawing Sheets

(51) Int. Cl.
  *B60R 11/02* (2006.01)
  *B60K 35/00* (2006.01)
  *G02B 27/00* (2006.01)
  *B60K 37/02* (2006.01)

(52) U.S. Cl.
  CPC ..... *G02B 27/0093* (2013.01); *G02B 27/0149* (2013.01); *G09G 3/001* (2013.01); *B60K 37/02* (2013.01); *B60K 2370/155* (2019.05); *B60K 2370/1529* (2019.05); *B60K 2370/31* (2019.05); *B60K 2370/334* (2019.05); *G02B 2027/013* (2013.01); *G02B 2027/014* (2013.01); *G02B 2027/0121* (2013.01); *G02B 2027/0127* (2013.01); *G02B 2027/0138* (2013.01); *G02B 2027/0159* (2013.01); *G02B 2027/0181* (2013.01); *G02B 2027/0185* (2013.01); *G09G 2320/0257* (2013.01); *G09G 2354/00* (2013.01)

(56) References Cited

U.S. PATENT DOCUMENTS

2005/0046755 A1* 3/2005 Hattori ............... B60R 11/0211
  348/837
2011/0194163 A1 8/2011 Shimizu et al.
2012/0224062 A1* 9/2012 Lacoste ................. G02B 27/01
  348/148
2014/0104840 A1* 4/2014 Iseki ..................... G02B 26/10
  362/259
2016/0178902 A1* 6/2016 Ando ..................... B60R 1/00
  348/115
2016/0209647 A1* 7/2016 Fursich ............... G02B 27/0093
2016/0266391 A1* 9/2016 Han ..................... G09G 3/001
2017/0072663 A1* 3/2017 Sadakane ........... G02B 27/0101
2017/0313032 A1* 11/2017 Arndt ..................... B41J 2/155

FOREIGN PATENT DOCUMENTS

| JP | 3-209210 | 9/1991 |
| JP | 2009-184406 | 8/2009 |
| WO | 2009/071135 A1 | 6/2009 |
| WO | 2010/061835 | 6/2010 |

OTHER PUBLICATIONS

International Search Report of PCT application No. PCT/JP2016/002831 dated Aug. 16, 2016.

* cited by examiner

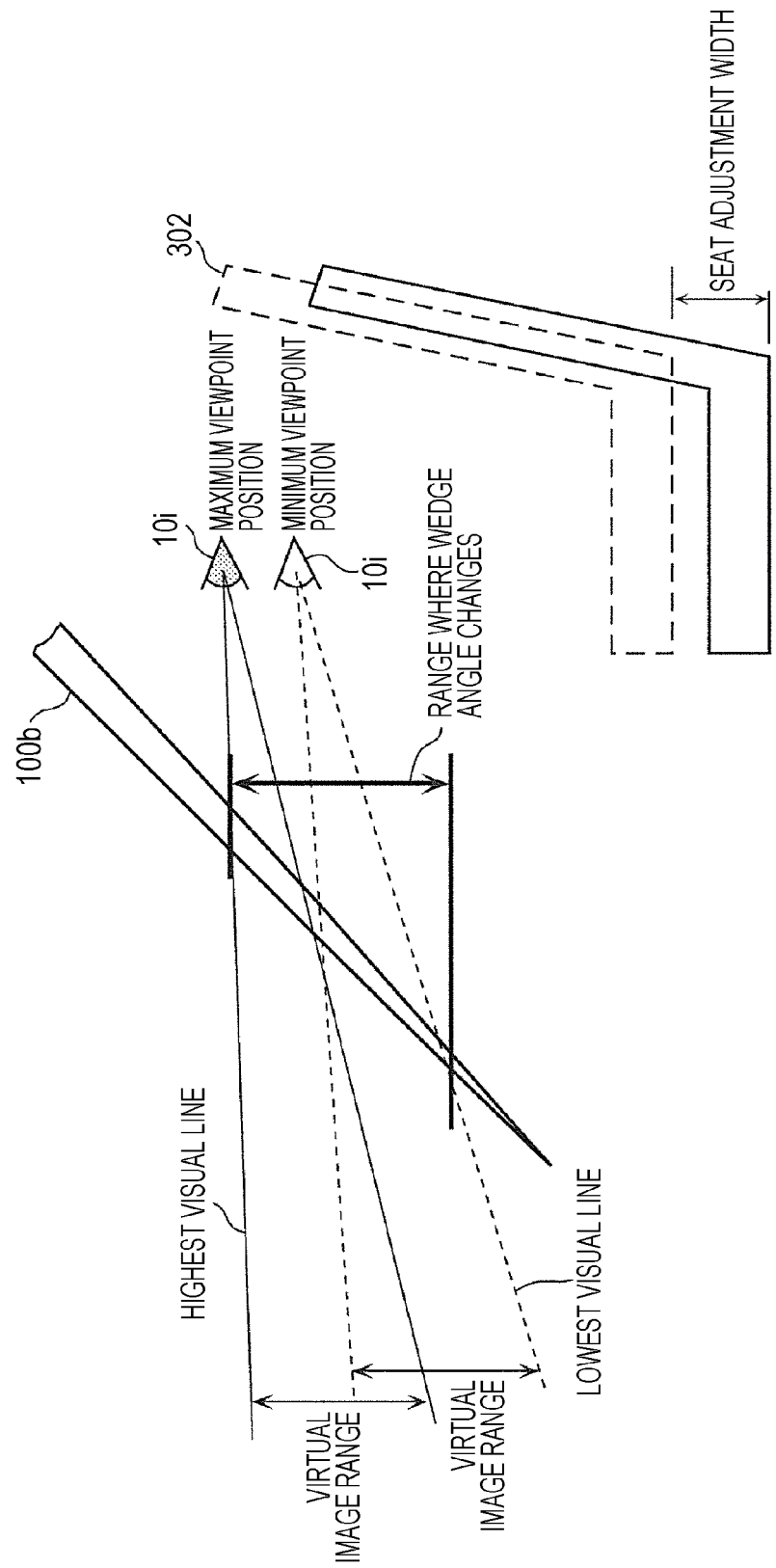

DISPLAY DEVICE, DISPLAY METHOD AND DISPLAY MEDIUM

This application is a U.S. national stage application of the PCT International Application No. PCT/JP2016/002831 filed on Jun. 13, 2016, which claims the benefit of foreign priority of Japanese patent application No. 2015-131926 filed on Jun. 30, 2015, the contents all of which are incorporated herein by reference.

TECHNICAL FIELD

The present disclosure relates to a display device that displays an image and the like.

BACKGROUND ART

Conventionally, there has been proposed a display device in which light expressing an image is projected onto a plate-shape display medium having translucency and reflected by the display medium, and thus a user is caused to visually recognize the image as a virtual image while seeing a background through the display medium. What is called AR (Augmented Reality) is used in the display device, and an image related to an actual background can be displayed in the background. Particularly, in an automobile-related field, there is developed a Head-Up Display (HUD) in which an image indicating a speed or various warnings during driving is displayed in front of a windshield as a virtual image (for example, see PTL 1).

The use of the display device enables a driver who is of the user to see information (such as a map and a speedometer) about driving without largely moving a visual line while seeing a forward outer world, so that the driver can drive safer.

CITATION LIST

Patent Literature

PTL 1: Unexamined Japanese Patent Publication No. H3-209210

SUMMARY OF THE INVENTION

However, in the head-up display of PTL 1, there is a problem that a double image is easily generated.

The present disclosure provides a display device that can suppress the generation of the double image.

According to one aspect of the present disclosure, a display device includes a plate-shape display medium having translucency and a projection unit that projects light expressing an image onto the display medium such that the light is reflected toward a user by the display medium. The projection unit changes a display distance between an eye of the user and a position of an image visually recognized as a virtual image by the user through the display medium by the light projection. The display medium is formed such that a wedge angle that is of an angle formed between a front side and a back side in a region located at any level of the display medium is continuously decreased with increasing level.

Note that those comprehensive or specific aspects may be implemented by a system, a method, an integrated circuit, a computer program, or a computer-readable recording medium such as a CD-ROM, or may be implemented by any combination of the system, the method, the integrated circuit, the computer program, and the recording medium.

The display device of the present disclosure can suppress the generation of the double image.

BRIEF DESCRIPTION OF DRAWINGS

FIG. 10 is a view illustrating a seat adjustment width and a range where the wedge angle of a windshield changes in the exemplary embodiment.

Figure 1:
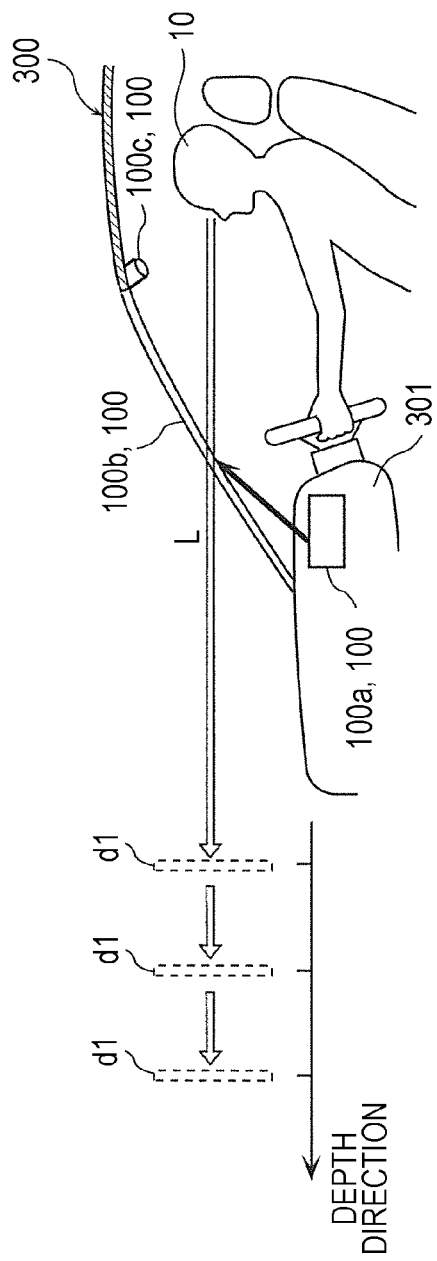
FIG. 1 is a view illustrating an example of a display device in use according to an exemplary embodiment.

DESCRIPTION OF EMBODIMENT (Knowledge Underlying the Present Invention)

The inventors of the present invention have found that the following problems arise in the head-up display of PTL 1 described in "BACKGROUND ART".

The wedge angle that is of an angle formed between a front side and a back side of the windshield is adjusted in the head-up display of PTL 1. That is, the wedge angle is adjusted such that an image is displayed as a virtual image at a position through the windshield, namely, a position separated from a user in a depth direction by a predetermined distance. Accordingly, when the image is displayed as the virtual image at the positions different from each other in the depth direction using the windshield, sometimes the virtual image appears as the double image.

In order to solve the problem, a display device according to one aspect of the present disclosure includes a plate-shape display medium having translucency and a projection unit that projects light expressing an image onto the display medium such that the light is reflected toward a user by the display medium. The projection unit changes a display distance between an eye of the user and a position of an image visually recognized as a virtual image by the user through the display medium by the light projection. The display medium is formed such that a wedge angle that is of an angle formed between a front side and a back side in a region located at any level of the display medium is continuously decreased with increasing level.

For example, in a case where the display distance is lengthened, namely, in a case where the position of the image visually recognized as the virtual image becomes farther in the depth direction, the image appears by reflection of the light in the high region of the display medium. On the other hand, in a case where the display distance is shortened, namely, in a case where the position of the image visually recognized as the virtual image becomes closer in the depth direction, the image appears by reflection of the light in the low region of the display medium. At this point, there is a one-to-one relationship between the position of the image appearing as the virtual image and the wedge angle. Accordingly, when the regions having different levels in the display medium are equal to each other in the wedge angle in a case where the position of the image varies in the depth direction as described above, the above relationship is not satisfied, but the double image is easily generated.

In the display device of one aspect of the present invention, the display medium is formed such that a wedge angle that is of an angle formed between a front side and a back side in the region located at any level of the display medium is continuously decreased with increasing level, so that the generation of the double image can be suppressed.

That is, in a case where the position of the image becomes farther in the depth direction, the region of the display medium reflecting the light showing the image at the position has a high position, and the region has the small wedge angle. Accordingly, even if the image is located farther, the image hardly becomes the double image. On the other hand, in a case where the position of the image becomes closer in the depth direction, the region of the display medium reflecting the light showing the image at the position has a low position, and the region has the large wedge angle. Accordingly, even if the image is located closer, the image hardly becomes the double image. Therefore, the generation of the double image can be suppressed even if the position of the image changes in the depth direction.

The display device may further include a detector that detects a level of the user's eye, and the projection unit may change the display distance according to the detected level of the eye. For example, the projection unit changes the display distance such that the display distance becomes longer than the reference display distance, which is of a distance when the eye of the user is located at the reference level, when the detected level of the eye is higher than the reference level. Alternatively, the projection unit changes the display distance such that the display distance becomes shorter than the reference display distance, which is of the distance when the eye of the user is located at the reference level, when the detected level of the eye is lower than the reference level.

For example, when the user's eye is located at the high level, a high region of the display medium is used to display the image, and the region has the small wedge angle. Accordingly, for the short display distance, the double image is easily generated. However, because the projection unit lengthens the display distance, the generation of the double image can be suppressed even if the user's eye is located at the high level. On the other hand, when the user's eye is located at the low level, a low region of the display medium is used to display the image, and the region has the large wedge angle. Accordingly, for the long display distance, the double image is easily generated. However, because the projection unit shortens the display distance, the generation of the double image can be suppressed even if the user's eye is located at the low level.

When the display distance is equal to an intermediate distance between a minimum distance and a maximum distance in a range where the display distance can be taken, and when the level of the eye of the user is equal to the reference level, the wedge angle in the region reflecting the light of the display medium may be adjusted as follows. That is, the wedge angle may be adjusted in the region reflecting the light of the display medium such that a first optical path in which the light reflected by one of the front side and the back side of the display medium travels from the display medium toward the user is substantially matched with a second optical path in which the light reflected by another of the front side and the back side travels from the display medium toward the user.

Thus, when the display distance is the intermediate distance while the level of the user's eye is the reference level, the wedge angle is adjusted such that the first optical path and the second optical path are substantially matched with each other, so that the generation of the double image can sufficiently be suppressed. When the reference level is matched with the level of the eye of a standard person, the image hardly becomes the double image even if any person visually recognizes the image as the user, or even if the visually-recognized image is located at any display distance.

The display device may further include an adjustment mechanism that adjusts a level of a seat on which the user who visually recognizes the image sits. When one of a plurality of candidates of the user sits on the seat, a range where the level of the seat is adjusted by the adjustment mechanism may be set to a maximum value or more of a difference in sitting height of the plurality of candidates such that the level of the eye of any candidate becomes the reference level.

Therefore, even if any person sits on the seat, the level of the eye of the person can be matched with the reference level, and the generation of the double image can sufficiently be suppressed for any person.

The display device may further include an adjustment mechanism that adjusts a level of a seat on which the user who visually recognizes the image sits. A range where the level of the seat is adjusted by the adjustment mechanism may be set such that, when each of a plurality of candidates of the user sits on the seat, a range where a visual line in which the image is visually recognized by eyes having different levels of the plurality of candidates traverses the display medium is substantially matched with a range where the wedge angle changes continuously in the display medium.

Therefore, the generation of the double image can be suppressed for any person even if the range where the wedge angle changes continuously is restricted to a part of the display medium.

Note that those comprehensive or specific aspects may be implemented by a system, a method, an integrated circuit, a computer program, or a computer-readable recording medium such as a CD-ROM, or may be implemented by any combination of the system, the method, the integrated circuit, the computer program, and the recording medium.

Hereinafter, an exemplary embodiment will specifically be described with reference to the drawings.

Note that the following exemplary embodiment provides a comprehensive, specific example of the present invention. Numerical values, shapes, materials, components, arrangement positions and connection modes of the components, steps, and order of the steps, for example, illustrated in the exemplary embodiment are examples, and therefore are not intended to limit the present invention. Furthermore, among components in the following exemplary embodiment, components not recited in the independent claim indicating the broadest concept are described as optional components. In the following sectional views of the following drawings, part or whole of hatching is omitted for convenience.

First Exemplary Embodiment

FIG. 1 is a view of a use example of a display device according to an exemplary embodiment.

Display device 100 of the exemplary embodiment is configured as what is called a head-up display, and includes projection unit 100a, windshield 100b, and imager 100c.

Windshield 100b is a plate-shape display medium having translucency.

For example, projection unit 100a is attached in dashboard 301 of vehicle 300. Projection unit 100a projects light expressing an image onto windshield 100b such that the light is reflected toward user 10 by windshield 100b. Specifically, projection unit 100a projects the light expressing image d1 onto windshield 100b, and causes windshield 100b to reflect the light. The reflected light is oriented toward a driver who is of user 10. Resultantly, user can visually recognize image d1 that appears outside (vehicle outside) windshield 100b by the reflected light as a virtual image while seeing a background through windshield 100b. That is, display device 100 of the exemplary embodiment displays image d1 as the virtual image outside windshield 100b, namely, through windshield 100b.

Image d1 is an image indicating information about vehicle 300 or various pieces of information used to support driving of user 10. Specifically, the pieces of information are information about a warning about an obstacle (other vehicles or a pedestrian), for example. The pieces of information are information (such as an arrow indicating a right-turn direction or a left-turn direction) based on a guide route set by a navigation device. The pieces of information are information such as a current vehicle speed, a guide sign, a map, traffic information, news, a weather forecast, time, a screen of a smartphone connected to display device 100, and a TV program.

Projection unit 100a changes a position of the image, which is visually recognized as the virtual image by user 10 through windshield 100b by the projection of the light, along a depth direction connecting user 10 and windshield 100b. That is, projection unit 100a changes distance (hereinafter, referred to as a display distance) L in the depth direction between the position of image and an eye of user 10. For example, display distance L ranges from 2.5 m to 20 m.

For example, imager 100c is attached near a ceiling in vehicle 300. Imager 100c takes an image of a subject including the eye of user 10, and outputs imaging data obtained by the imaging to projection unit 100a.

When obtaining the imaging data output from imager 100c, projection unit 100a detects a level of the eye of user 10 based on the imaging data. That is, for example, projection unit 100a detects the level of the eye from a ground or a floor of vehicle 300. Display device 100 changes display distance L based on the level of the eye.

Figure 2:
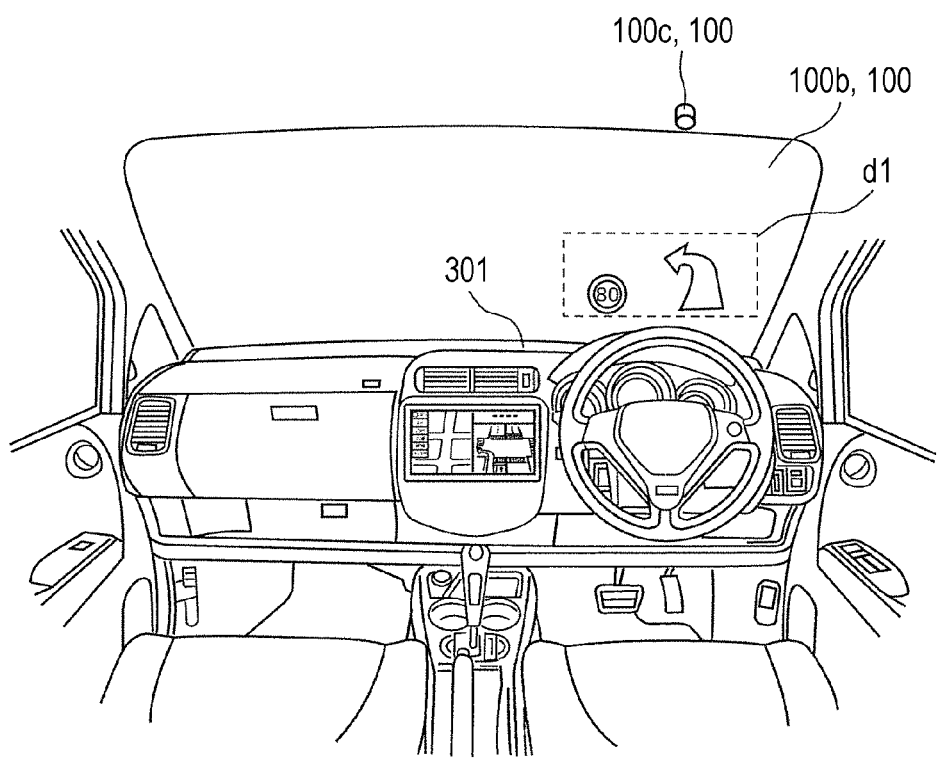
FIG. 2 is a view of an example of an image displayed by display device 100 of the exemplary embodiment.

FIG. 2 is a view of an example of image d1 displayed by display device 100 of the exemplary embodiment.

Projection unit 100a attached to dashboard 301 projects the light expressing image d1 onto a projection area on a lower side close to a driver's seat of windshield 100b, whereby image d1 is displayed as the virtual image on the deep side (vehicle outside) of the projection area when viewed from user 10 who is of the driver. At this point, projection unit 100a may two-dimensionally display images d1 at different positions of display distance L as illustrated in FIG. 1, or three-dimensionally display one image d1 as illustrated in FIG. 2. That is, display device 100 may display image d1 having display distance L which is shorter toward a lower side in the image while being longer toward an upper side, namely, deep image d1. Specifically, display device 100 may display image d1 including an arrow, which extends along a road from the side of vehicle 300 and indicates a traveling direction of vehicle 300.

Figure 3:
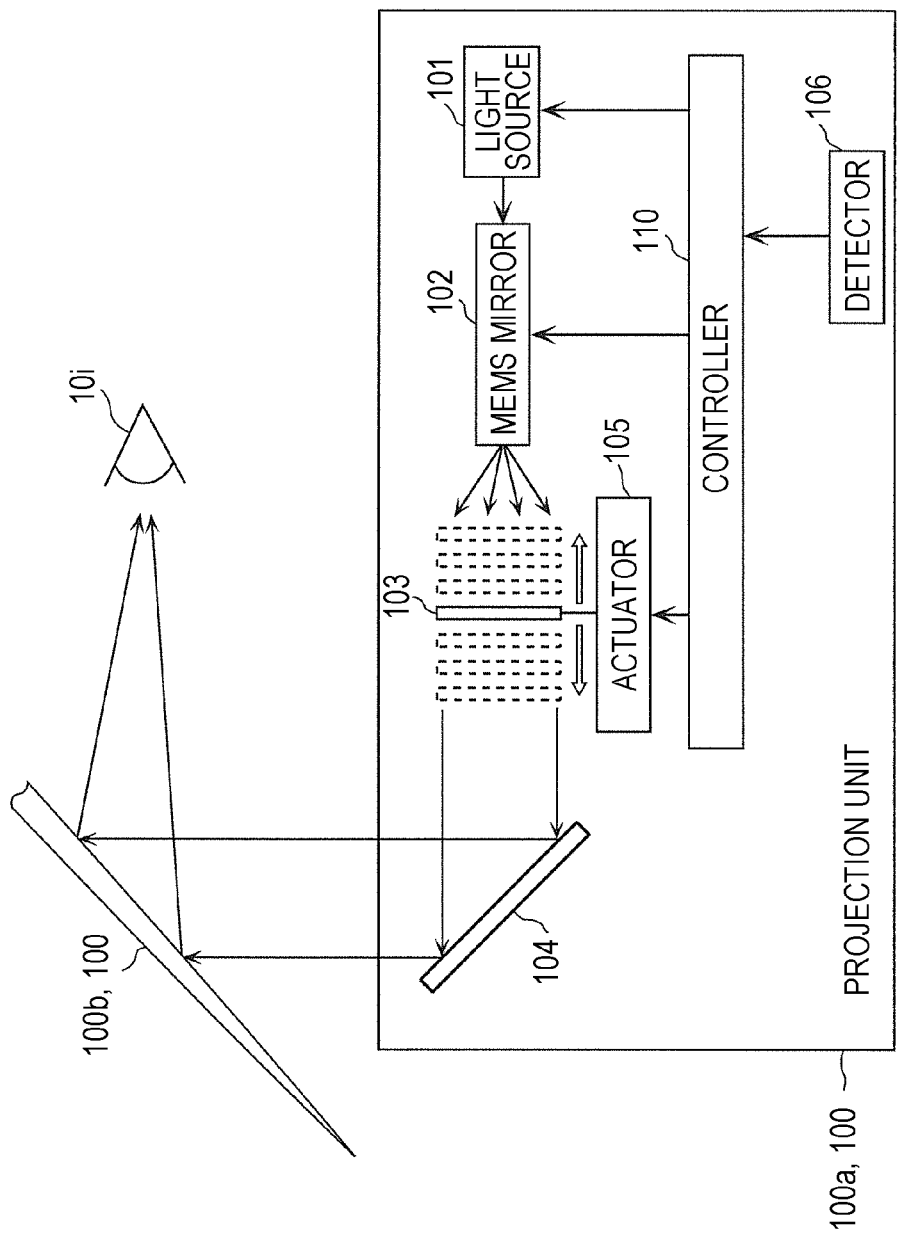
FIG. 3 is a block diagram illustrating a configuration of a projection unit of the exemplary embodiment.

FIG. 3 is a block diagram illustrating a configuration of projection unit 100a of the exemplary embodiment.

For example, projection unit 100a is a device that projects the light expressing image d1 by a laser scan system (raster scan system). Projection unit 100a includes light source 101, MEMS (Micro Electro Mechanical Systems) mirror 102, intermediate screen 103, projection mirror 104, actuator 105, detector 106, and controller 110.

For example, light source 101 is a semiconductor laser. Light source 101 irradiates MEMS mirror 102 with a laser beam having each color of R (red), G (green), and B (blue) under control of controller 110.

MEMS mirror 102 reflects the laser beam from light source 101, and irradiates intermediate screen 103 with the laser beam. At this point, MEMS mirror 102 swings under the control of controller 110 such that raster scan is performed on intermediate screen 103 using the laser beam.

Intermediate screen 103 is a translucent screen. The image appears on an irradiation surface by performing the raster scan on the irradiation surface of intermediate screen 103 on the side of MEMS mirror 102 using the laser beam. Because intermediate screen 103 is translucent, the same image as the image on the irradiation surface also appears in a transmission surface that is of a surface opposite to the irradiation surface of intermediate screen 103.

Projection mirror 104 includes at least one mirror, receives image light that is of the light expressing the image appearing in the transmission surface of intermediate screen 103, and reflects the image light toward windshield 100b. The image light is reflected from windshield 100b toward eye 10i of user 10. Projection mirror 104 may be configured with one mirror or a plurality of mirrors.

Actuator 105 moves intermediate screen 103 back and forth under the control of controller 110. When intermediate screen 103 moves forward, namely, onto the side of projection mirror 104, display distance L of image d1 appearing as the virtual image is shortened. That is, image d1 becomes closer. On the other hand, when intermediate screen 103 moves backward, namely, onto the side of MEMS mirror 102, display distance L of image d1 is lengthened. That is, the virtual image of image d1 becomes farther.

Detector 106 obtains the imaging data from imager 100c, and detects the level of eye 10i of the user based on the imaging data. Detector 106 outputs an adjustment level signal indicating the level to controller 110.

Controller 110 obtains the image data indicating a content of image d1 from an external device of projection unit 100a, and controls light source 101, MEMS mirror 102, and actuator 105 based on the image data.

When obtaining the adjustment level signal output from detector 106, controller 110 calculates a difference between a level indicated by the adjustment level signal and a reference level as an adjustment level. For example, in a case where the level indicated by the adjustment level signal is higher than the reference level, controller 110 controls actuator 105 such that the display distance of image d1 becomes longer with increasing adjustment level, and such that the display distance of image d1 becomes shorter with decreasing adjustment level.

Figure 4A:
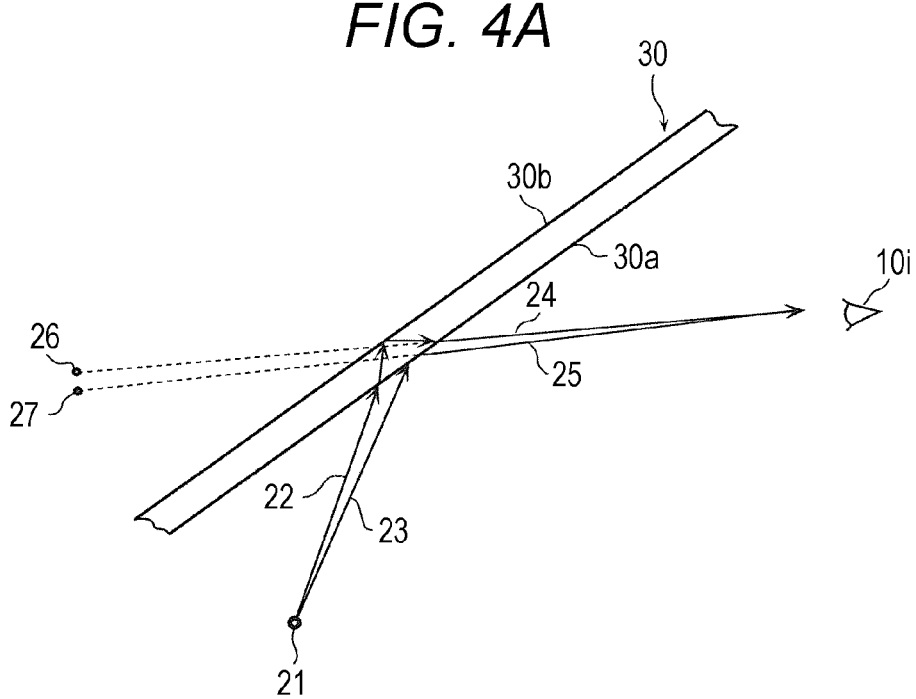
FIG. 4A is a view illustrating an example of a state in which a double image appears.

FIG. 4A is a view illustrating an example of a state in which the double image appears.

For example, the double image is generated when surface 30a that is of a vehicle inside surface of windshield 30 is parallel to back side 30b that is of a vehicle outside surface of windshield 30. There are two optical paths of the light from light source 21 to eye 10i of the user. For example, a first optical path is constructed with optical path 22 and optical path 24. That is, in the first optical path, the light from light source 21 travels toward windshield 30 along optical path 22, and is reflected from back side 30b through front side 30a of windshield 30. The reflected light travels from front side 30a toward eye 10i of the user along optical path 24. A second optical path is constructed with optical path 23 and optical path 25. That is, in the second optical path, the light from light source 21 travels toward windshield 30 along optical path 23, and is reflected from front side 30a of windshield 30. The reflected light travels from front side 30a toward eye 10i of the user along optical path 25.

At this point, optical path 24 in the first optical path is not matched with optical path 25 in the second optical path. Accordingly, virtual image 26 of light source 21 based on the first optical path and virtual image 27 of light source 21 based on the second optical path appear at different positions. Therefore, the double image (ghost) appears.

Figure 4B:
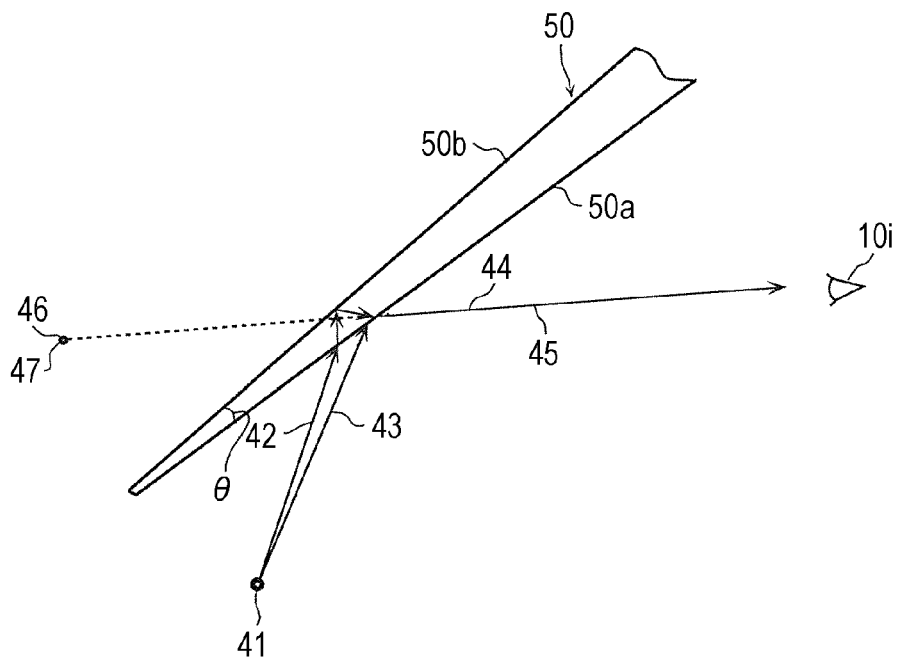
FIG. 4B is a view illustrating an example of a state in which generation of the double image is suppressed.

FIG. 4B is a view illustrating an example of a state in which the generation of the double image is suppressed.

A section of windshield 50 is formed into a wedge shape in order to suppress the generation of the double image. That is, a wedge angle that is of an angle formed between front side 30a that is of the vehicle inside surface of windshield 50 and back side 30b that is of the vehicle outside surface of windshield 50 is adjusted to a finite numerical value θ larger than 0. Even in windshield 50, there are two optical paths of the light from light source 41 to eye 10i of the user. The optical paths are identical to each other in the optical path from windshield 50 to eye 10i.

That is, the first optical path is constructed with optical path 42 and optical path 44. In the first optical path, the light from light source 41 travels toward windshield 50 along optical path 42, and is reflected from back side 50b through front side 50a of windshield 50. The reflected light travels from front side 50a toward eye 10i of the user along optical path 44. A second optical path is constructed with optical path 43 and optical path 45. In the second optical path, the light from light source 41 travels toward windshield 50 along optical path 43, and is reflected from front side 50a of windshield 50. The reflected light travels from front side 50a toward eye 10i of the user along optical path 45.

At this point, optical path 44 in the first optical path is matched with the optical path 45 in the second optical path. Accordingly, virtual image 46 of light source 41 based on the first optical path and virtual image 47 of light source 41 based on the second optical path appear at the same position. Therefore, the generation of the double image (ghost) is suppressed.

However, in a case where the position at which the virtual image of light source 41 appears is changed in the depth direction, namely, in a case where display distance L of image d1 is changed like projection unit 100a of the exemplary embodiment, the double image is generated even if the section of the windshield is formed into the wedge shape.

That is, wedge angle θ is an angle, which is adjusted such that the image appearing as the virtual image at a predetermined display distance does not become the double image, and the double image is generated in a case where the display distance is changed from the predetermined display distance.

In other words, with increasing wedge angle, the image located at shorter display distance L, namely, the closer image can clearly be displayed while the generation of the double image is suppressed. On the contrary, the double image is generated when the image located at longer display distance L, namely, the farther image is displayed. With decreasing wedge angle, the image located at longer display distance L, namely, the farther image can clearly be displayed while the generation of the double image is suppressed.

On the contrary, the double image is generated when the image located at shorter display distance L, namely, the closer image is displayed.

Therefore, windshield 100b of the exemplary embodiment is formed such that the wedge angle that is of the angle formed between the front side and the back side at a region located at any level of windshield 100b is continuously decreased with increasing level.

Figure 5:
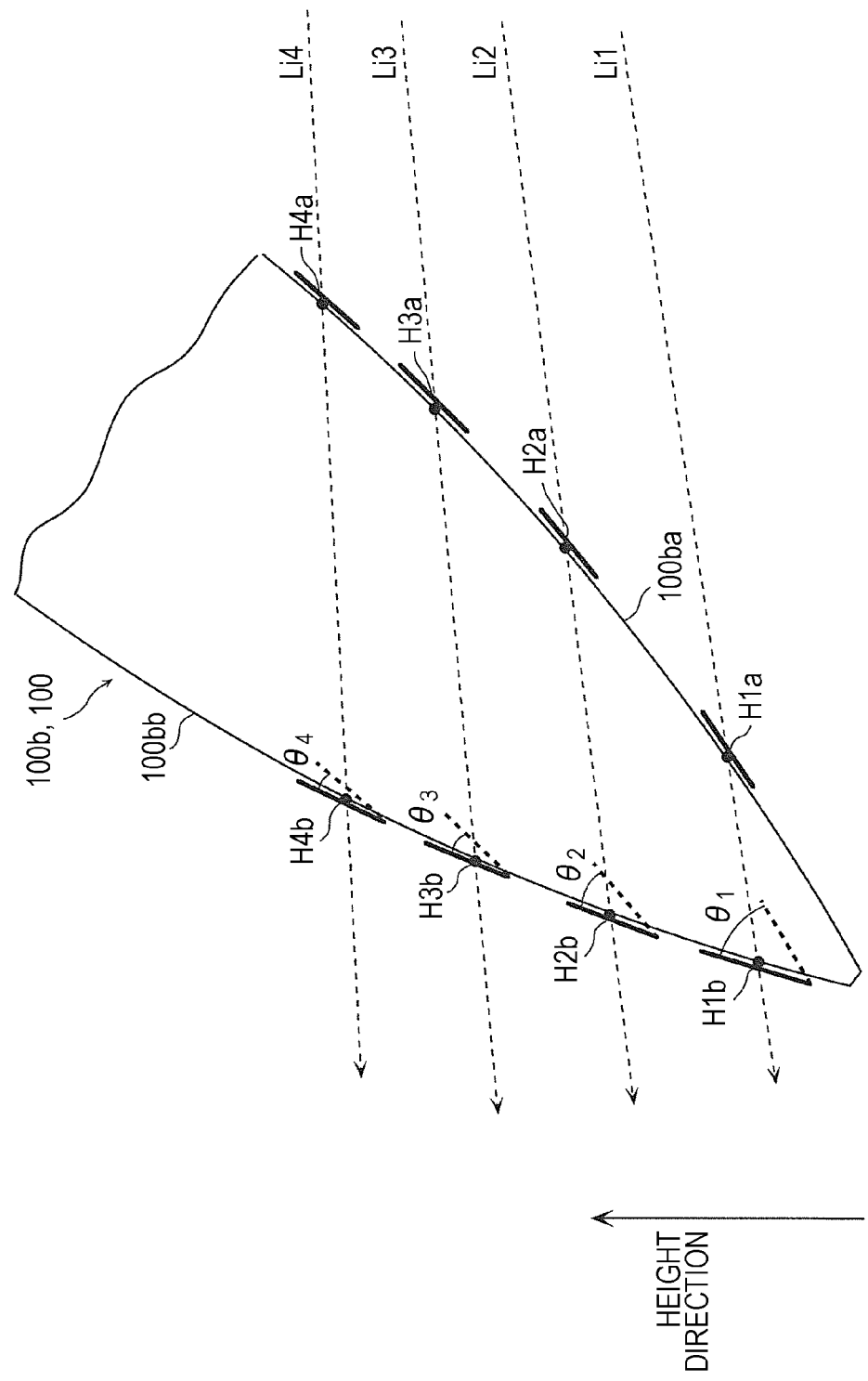
FIG. 5 is a sectional view of a windshield of the exemplary embodiment.

FIG. 5 is a sectional view of windshield 100b of the exemplary embodiment.

As illustrated in FIG. 5, windshield 100b of the exemplary embodiment is formed such that the wedge angle at the position is continuously decreased with increasing level in a height direction of windshield 100b.

Specifically, for example, in back side 100bb of windshield 100b, levels of four positions H1b to H4b are increased in the order of position H1b, position H2b, position H3b, and position H4b.

Wedge angle θ1 in the region at position H1b is an angle formed between a tangent at position H1b of back side 100bb and a tangent at position H1a of front side 100ba. At this point, position H1a and position H1b are positions optically correlated with each other based on visual line Li1 from eye 10i of the user.

Similarly, wedge angle θ2 in the region at position H2b is an angle formed between a tangent at position H2b of back side 100bb and a tangent at position H2a of front side 100ba. At this point, position H2a and position H2b are positions optically correlated with each other based on visual line Li2 from eye 10i of the user.

Similarly, wedge angle θ3 in the region at position H3b is an angle formed between a tangent at position H3b of back side 100bb and a tangent at position H3a of front side 100ba. At this point, position H3a and position H3b are positions optically correlated with each other based on visual line Li3 from eye 10i of the user.

Similarly, wedge angle θ4 in the region at position H4b is an angle formed between a tangent at position H4b of back side 100bb and a tangent at position H4a of front side 100ba. At this point, position H4a and position H4b are positions optically correlated with each other based on visual line Li4 from eye 10i of the user.

In this case, the wedge angles in the regions at positions H1b to H4b satisfy a relationship of θ1>θ2>θ3>θ4. The relationship between the position in the height direction of windshield 100b and the wedge angle is satisfied between not only above described positions H1b to H4b and wedge angle θ1 to θ4, but also a plurality of any positions and wedge angles at the positions.

The user sees an upper side of windshield 100b with increasing display distance L of the visual recognition target image (virtual image). On the other hand the user sees a lower side of windshield 100b with decreasing display distance L of the visual recognition target image. That is, the user sees the image located at the position having short display distance L according to visual line Li1, and sees the image located at the position having slightly long display distance L according to visual line Li2 directed above visual line Li1. The user sees the image located at the position having long display distance L according to visual line Li3 directed above visual line Li2, and sees the image located at the position having longer display distance L according to visual line Li4 directed above visual line Li3.

In windshield 100b of the exemplary embodiment, the user sees the upper side of windshield 100b with increasing display distance L of the visual recognition target image, so that the wedge angle corresponding to the user's visual line at that time can be decreased. Resultantly, display device 100 of the exemplary embodiment can clearly display the far image while suppressing the generation of the double image. On the other hand, in windshield 100b of the exemplary embodiment, the user sees the lower side of windshield 100b with decreasing display distance L of the visual recognition target image, so that the wedge angle corresponding to the user's visual line at that time can be increased. Resultantly, display device 100 of the exemplary embodiment can clearly display the close image while suppressing the generation of the double image.

When eye 10i of the user is located at the reference level, the wedge angle of windshield 100b is adjusted such that image d1 appearing as the virtual image at the position separated from eye 10i of the user by a reference display distance in the depth direction is clearly displayed while the generation of the double image is suppressed.

Figure 6:
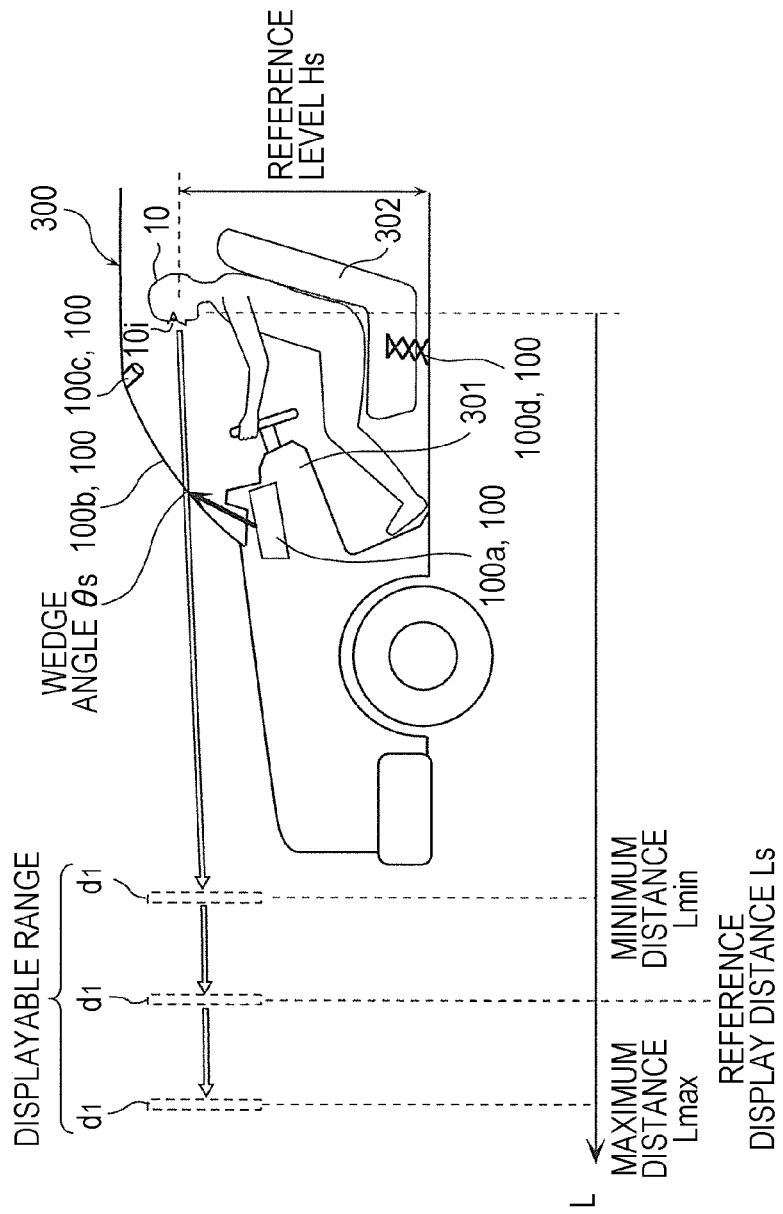
FIG. 6 is a view illustrating a relationship among a reference level, a reference display distance, and a wedge angle in the exemplary embodiment.

FIG. 6 is a view illustrating a relationship among the reference level, the reference display distance, and the wedge angle.

For example, reference level Hs is a predetermined level from a ground or a floor of vehicle 300. Reference display distance Ls is an intermediate distance between minimum distance Lmin and maximum distance Lmax in a displayable range that is of a range where display distance L can be taken. The displayable range is fixed depending on a movement width of intermediate screen 103 moved by actuator 105.

When display distance L is equal to reference display distance Ls while the level of eye 10i of user 10 is equal to reference level Hs, wedge angle θs in a specific region of windshield 100b is adjusted such that the double image is sufficiently suppressed. The specific region is a region of windshield 100b that reflects light, which is projected from projection unit 100a and expresses the image as the virtual image at the position of reference display distance Ls, toward eye 10i of user 10 located at reference level Hs. That is, similarly to the example in FIG. 4B, the wedge angle is adjusted to θs in the specific region reflecting the light of windshield 100b such that the two optical paths are substantially matched with each other. The first optical path of the two optical paths is an optical path in which the light reflected by one of the front side and the back side of windshield 100b travels from windshield 100b toward user 10. The second optical path of the two optical paths is an optical path in which the light reflected by another of the front side and the back side travels from windshield 100b toward user 10.

Thus, in the exemplary embodiment, when display distance L is the intermediate distance while the level of the user's eye is reference level Hs, the wedge angle is adjusted such that the first optical path and the second optical path are substantially matched with each other, so that the generation of the double image can sufficiently be suppressed. When reference level Hs is matched with the level of the eye of a standard person, the image hardly becomes the double image even if any person visually recognizes the image as the user, or even if the visually-recognized image is located at any display distance L.

At this point, display device 100 may include adjustment mechanism 100d that adjusts the level of seat 302 on which the user who visually recognizes image d1 sits. For example, a range where the level of seat 302 is adjusted by adjustment mechanism 100d is 200 mm or more. That is, in a case where one of a plurality of candidates of user 10 sits on seat 302, the range where the level of seat 302 is adjusted by adjustment mechanism 100d is set to a maximum value or more of a difference in sitting height of the plurality of candidates such that the level of the eye of any candidate becomes reference level Hs.

Therefore, even if any person sits on the seat as a user, the level of the eye of the person can be matched with reference level Hs, and the generation of the double image can sufficiently be suppressed for any person.

Figure 7:
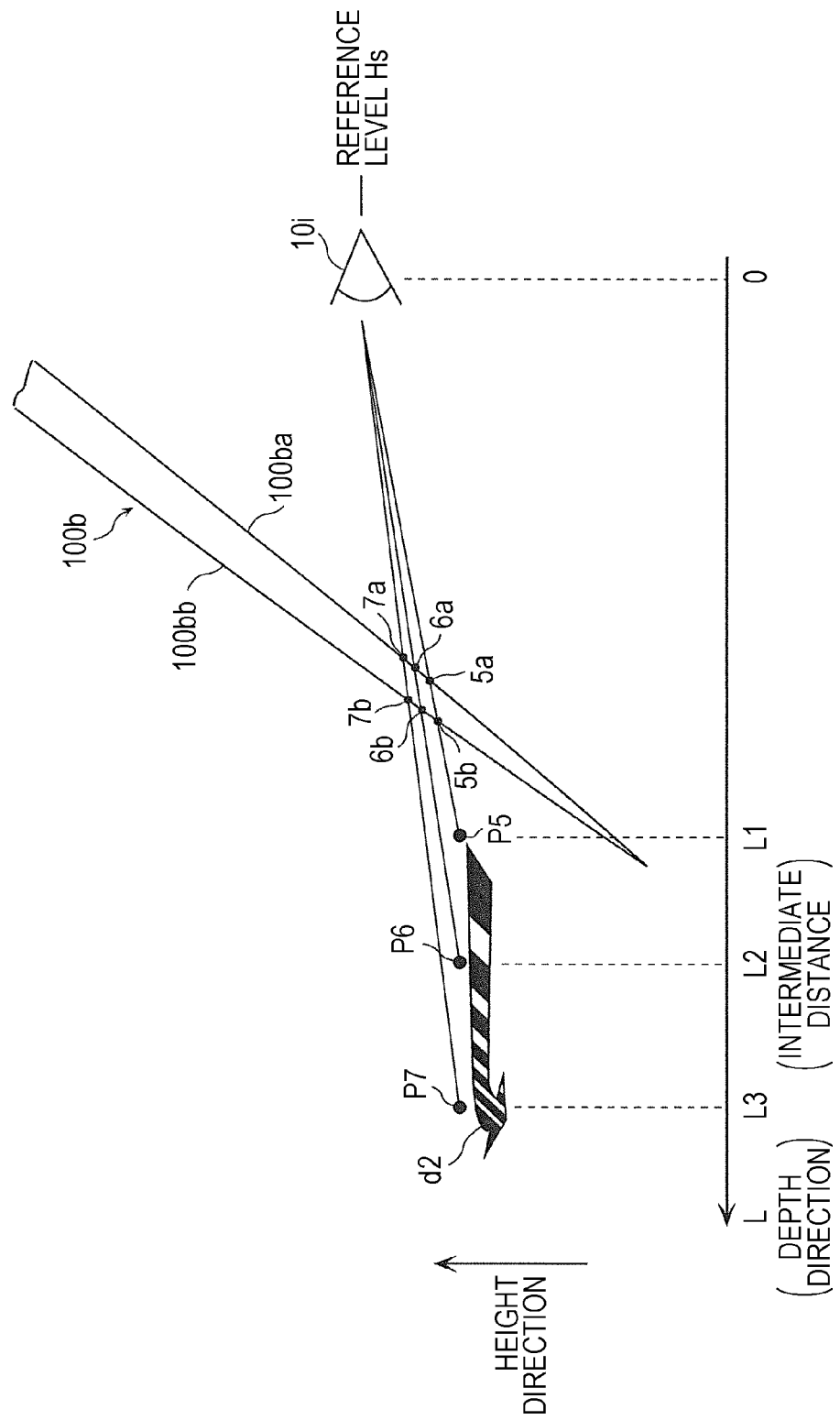
FIG. 7 is a view illustrating an example of a deep image in the exemplary embodiment.

FIG. 7 is a view illustrating an example of a state in which a deep image is displayed.

Display device 100 displays arrow d2 which is a deep image. For example, arrow d2 indicates the traveling direction of vehicle 300, and a root of arrow d2 is displayed close to the user. In each portion along the depth direction of arrow d2, the portion closer to a leading end is displayed farther. That is, display distance L1 at position P5 of the root of arrow d2, display distance L2 at position P6 in the central portion of arrow d2, and display distance L3 at position P7 in the leading end portion of arrow d2 have a relationship of L1<L2<L3.

When arrow d2 having the depth is displayed, projection unit 100a performs the raster scan while moving intermediate screen 103, and thus displaying arrow d2 including a portion having a different display distance.

At this point, the user directs the visual line downward. That is, eye 10i of the user is directed to positions 5a, 5b located in a lower side of windshield 100b. The wedge angles corresponding to positions 5a, 5b located in the lower side of windshield 100b are small as described above. Accordingly, the root of arrow d2 located at position P5 (L=L1) having short display distance L can clearly be displayed while the generation of the double image is suppressed.

The user directs the visual line slightly upward. That is, eye 10i of the user is directed to positions 6a, 6b located above positions 5a, 5b of windshield 100b. The wedge angles corresponding to positions 6a, 6b located in the slightly upper portion of windshield 100b are smaller than the wedge angles corresponding to positions 5a, 5b. Accordingly, a central portion of arrow d2 located at position P6 (L=L2) having slightly long display distance L can clearly be displayed while the generation of the double image is suppressed.

The user directs the visual line further upward. That is, eye 10i of the user is directed to positions 7a, 7b located above positions 6a, 6b of windshield 100b. The wedge angles corresponding to positions 7a, 7b located in the further upper portion of windshield 100b are smaller than the wedge angles corresponding to positions 6a, 6b. Accordingly, a leading end portion of arrow d2 located at position P7 (L=L3) having long display distance L can clearly be displayed while the generation of the double image is suppressed.

Figure 8:
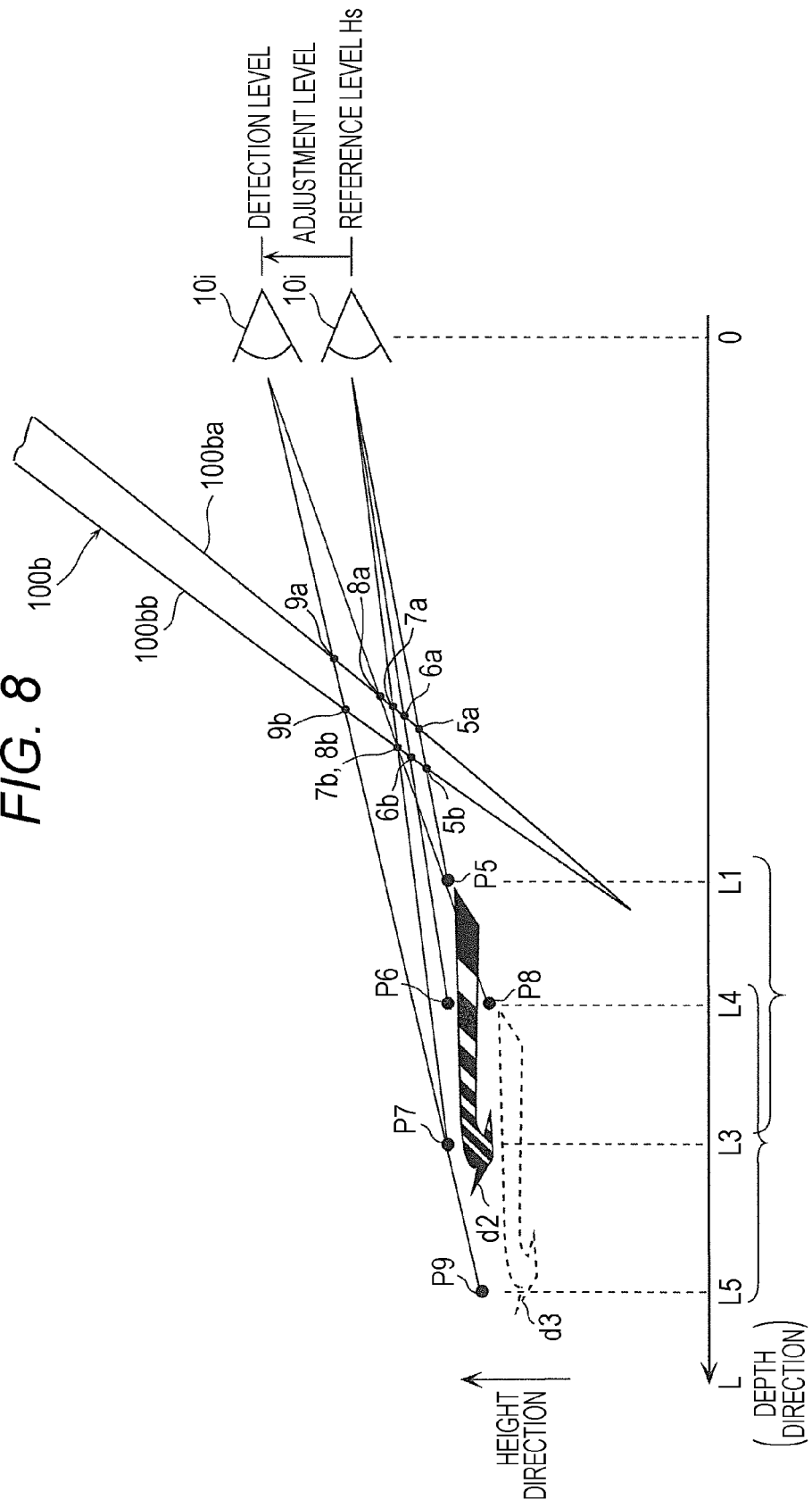
FIG. 8 is a view illustrating an example of a change in display distance of an image in the exemplary embodiment.

FIG. 8 is a view illustrating an example of a state in which the display distance of the image is changed.

Display device 100 displays arrow d2 that is of the deep image similarly to the example in FIG. 7.

At this point, imager 100c takes an image of the subject including the user's eye. Detector 106 of projection unit 100a detects the level of eye 10i of the user based on the imaging data indicating an imaging result. Controller 110 moves actuator 105 such that arrow d2 is displayed in the range of display distances L1 to L3 as illustrated in FIG. 7 when the detected level (detection level) of eye 10i of the user is predetermined reference level Hs. On the other hand, controller 110 moves actuator 105 such that arrow d2 is displayed in the range of display distances L4 to L5 as illustrated in FIG. 8 when the detected level of eye 10i of the user is higher than predetermined reference level Hs. The range of display distances LA to L5 is farther away from eye 10i of the user compared with the range of display distances L1 to L3. Specifically, controller 110 calculates the adjustment level by subtracting reference level Hs from the detection level. Controller 110 moves actuator 105 such that arrow d2 is displayed at the position (range) farther away from eye 10i of the user with increasing adjustment level. On the other hand, controller 110 moves actuator 105 such that arrow d2 is displayed in a range closer to eye 10i of the user than the range of display distances L1 to L3 when the detection level is lower than the reference level.

Figure 9:
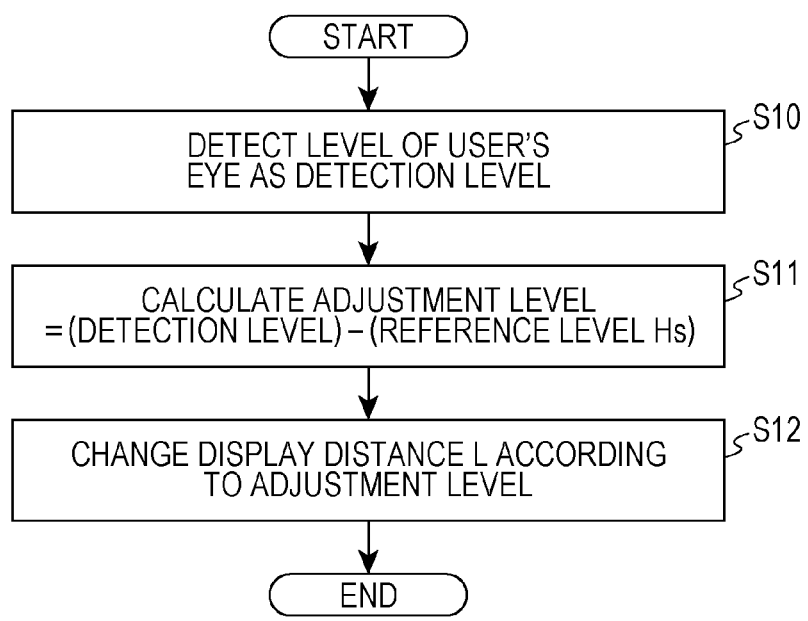
FIG. 9 is a flowchart illustrating a processing operation of the projection unit of the exemplary embodiment.

FIG. 9 is a flowchart illustrating processing operation of the projection unit 100a of the exemplary embodiment.

At first, detector 106 of projection unit 100a detects the level of the user's eye as a detection level (step S10). Then, controller 110 of projection unit 100a calculates the adjustment level by subtracting reference level Hs from the detection level (step S11). Then, controller 110 changes display distance L according to the adjustment level (step S12).

Thus, projection unit 100a of the exemplary embodiment changes display distance L, which is of a distance in the depth direction between eye 10i of the user and the position where the image appears as the virtual image, according to the detected level of eye 10i. Specifically, projection unit 100a changes the display distance L such that display distance L becomes longer than the reference display distance, which is of a distance when eye 10i of the user is located at the reference level, when the detected level of eye 10i is higher than the reference level. That is, controller 110 changes display distance L to display distance LA such that display distance L of the root of arrow d2 becomes longer than reference display distance L1, which is of the distance when eye 10i of the user is located at the reference level Hs. On the other hand, projection unit 100a changes display distance L such that display distance L becomes shorter than the reference display distance, which is of the distance when eye 10i of the user is located at the reference level, when the detected level of eye 10i is lower than the reference level Hs. That is, controller 110 changes display distance L such that display distance L of the root of arrow d2 becomes shorter than reference display distance L1, which is of the distance when eye 10i of the user is located at the reference level Hs.

In the exemplary embodiment, when the user's eye is located at the high level, the high region of windshield 100b is used to display the image, and the region has the small wedge angle. Accordingly, for the short display distance, the double image is easily generated. However, because projection unit 100a lengthens display distance L, the generation of the double image can be suppressed even if eye 10i of the user is located at the high level. On the other hand, when eye 10i of the user is located at the low level, the low region of windshield 100b is used to display the image, and the region has the large wedge angle. Accordingly, for the long display distance L, the double image is easily generated. However, because projection unit 100a shortens display distance L, the generation of the double image can be suppressed even if eye 10i of the user is located at the low level.

In the exemplary embodiment, display distance L is changed according to the level of eye 10i of the user. Alternatively, the generation of the double image may be suppressed by the adjustment mechanism of seat 302. For example, in a case where vehicle 300 on which display device 100 is mounted is a private automobile, the adjustment range (adjustable whole range) may be 200 mm or more. In this case, when the level of eye 10i of the user is adjusted, the double image can negligibly be suppressed without changing display distance L for each user. When the adjustment range is set to 150 mm or more, display distance L changed for each user can be suppressed to a small change width, and the image can be displayed without causing each user to have an uncomfortable feeling in the display distance.

The range where the wedge angle changes continuously in windshield 100b may be the whole of windshield 100b or a part of windshield 100b. In this case, the range (seat adjustment width) where seat 302 is adjusted by adjustment mechanism 100d may be set according to the range where the wedge angle changes.

FIG. 10 is a view illustrating the seat adjustment width and the range where the wedge angle of windshield 100b changes.

For example, in a case where a tall user sits on seat 302 as the driver, seat 302 is lowered by adjustment mechanism 100d. On the other hand, in a case where a short user sits on seat 302 as the driver, seat 302 is raised by adjustment mechanism 100d. However, there is a limitation to the seat adjustment width of adjustment mechanism 100d. Therefore, sometimes the level of the eye 10i of the tall user becomes high position even if seat 302 is lowered to the minimum, and sometimes the level of the eye 10i of the short user becomes low position even if seat 302 is raised to the maximum. Even if the level of seat 302 is adjusted, the level of eye 10i of each user varies between a maximum viewpoint position and a minimum viewpoint position.

Even if the level of eye 10i of each user is located at any position between the maximum viewpoint position and the minimum viewpoint position, it is necessary that the region in which the visual line seeing the image (virtual image) through windshield 100b traverses windshield 100b falls within the range where the wedge angle changes. That is, a range (visual line passing range) between the region in which the highest visual line in locating eye 10i at the maximum viewpoint position traverses windshield 100b and the region in which the lowest visual line in locating eye 10i at the minimum viewpoint position traverses windshield 100b is matched with the range where the wedge angle changes. In other words, the seat adjustment width of adjustment mechanism 100d is set such that the visual line passing range is matched with the range where the wedge angle changes. Therefore, the double image of the image (virtual image) visually recognized by the user can be suppressed even if the range where the wedge angle changes continuously in windshield 100b is restricted to a part, and even if the user having any height sits on seat 302.

In the exemplary embodiment, the components such as controller 110 and detector 106 may be configured with dedicated hardware, or implemented by execution of a software program individually suitable for each component.

A program execution section such as a CPU (Central Processing Unit) and a processor reads and executes a software program stored in a recording medium such as a hard disk and a semiconductor memory, and thus each component may be implemented. A computer program implementing display device 100 of the exemplary embodiment causes a computer to execute steps S10 to S12 in FIG. 9.

In the exemplary embodiment, display device 100 is the on-board device. However, display device 100 needs not to be the on-board device. For example, display device 100 may be mounted on eye glasses configured as a wearable device. In this case, for example, display device 100 projects the light expressing the image onto right and left lenses (display medium) of the eye glasses. Even if the display device 100 is mounted on the eye glasses, the generation of the double image can be suppressed similarly to the exemplary embodiment.

Windshield 100b of the exemplary embodiment may be configured with one glass plate, or an intermediate film and tow glass plates between which the intermediate film is sandwiched. There is no particular limitation to a material for the intermediate film as long as the material is a thermoplastic resin. Examples of the material include polyvinyl butyral, polyurethane, and ethylene-vinyl acetate copolymer and the like.

In display device 100 of the exemplary embodiment, display distance L is changed by the movement of the intermediate screen. Alternatively, for example, display distance L may be changed by another technique of moving a liquid crystal panel onto which video is projected.

Although display device 100 according to one or more aspects is described above based on the exemplary embodiment, the present invention is not limited to the exemplary embodiment. Various modifications made by those skilled in the art may be included in the present invention without departing from the scope of the present invention.

INDUSTRIAL APPLICABILITY

The present invention has an effect that the generation of the double image can be suppressed, and can be applied to an on-board head-up display and the like.

REFERENCE MARKS IN THE DRAWINGS

10 user
10i eye
21, 41, 101 light source
30, 50, 100b windshield
100 display device
100a projection unit
100c imager
100d adjustment mechanism
102 MEMS mirror
103 intermediate screen
104 projection mirror
105 actuator
106 detector
110 controller
300 vehicle
301 dashboard
302 seat
d1 image
d2 arrow

The invention claimed is:
1. A display device comprising:
a light transmissive display medium, the display medium having a plate-shape such that a wedge angle between an outside surface and an inside surface of the display medium within a predetermined height range of the display medium continuously decreases with increasing of the height of the display medium; and
a projector that projects light expressing an image onto the display medium such that the light is reflected toward a user by the display medium and changes a display distance between an eye of the user and a position of an image visually recognized as a virtual image by the user,
wherein the projector changes the display distance such that at an upper end of the predetermined height range, a display distance of an upper part of the image is longer than a display distance of a lower part of the same image at a lower end of the predetermined height range.

2. The display device according to claim 1, further comprising a camera that captures the user,
wherein the projector calculates a height of the eye of the user and changes the display distance according to the calculated height of the eye of the user.

3. The display device according to claim 2, wherein
the projector changes the display distance such that the display distance becomes longer than a reference display distance, which is of a distance when the eye of the user is located at a reference height, when the calculated height of the eye of the user is higher than the reference height.

4. The display device according to claim 2 or 3, wherein
the projector changes the display distance such that the display distance becomes shorter than the reference display distance, which is of the distance when the eye of the user is located at the reference height, when the calculated height of the eye of the user is lower than the reference height.

5. The display device according to claim 1, wherein
when (i) the display distance is equal to an intermediate distance between a minimum distance and a maximum distance in a range where the display distance can be taken, and (ii) the height of the eye of the user is equal to the reference height,
in the display medium, the wedge angle is adjusted such that a first optical path in which the light reflected by the inside surface of the display medium travels toward the user is substantially matched with a second optical path in which the light reflected by the outside surface of the display medium travels toward the user.

6. The display device according to claim 5, further comprising an adjustment mechanism that adjusts a height of a seat on which the user who visually recognizes the image sits,
wherein when one of a plurality of candidates of the user sits on the seat, a range where the height of the seat is adjusted by the adjustment mechanism is set to a maximum value or more of a difference in sitting height of the plurality of candidates such that the height of the eye of any candidate becomes the reference height.

7. The display device according to claim 1, further comprising an adjustment mechanism that adjusts a height of a seat on which the user who visually recognizes the image sits,
wherein a range where the height of the seat is adjusted by the adjustment mechanism is set such that a range where a visual line in which the image is visually recognized by eyes having different heights of the plurality of candidates of the user who sits on the seat traverses the display medium is substantially matched with a range where the wedge angle changes continuously in the display medium.

8. The display device according to claim 1, wherein the projector projects the light expressing the image by a laser scan system.

9. The display device according to claim 8, wherein the projector further includes:

a light source that emits the light
a MEMS mirror that reflects the light from the light source;
an intermediate screen which on the image appears by the light from the MEMS mirror;
a projection mirror that the light from the intermediate screen toward the display medium; and
an actuator that moves the intermediate screen, wherein the projector changes the display distance by moving the intermediate screen.

10. The display device according to claim 1, wherein:
the image is a three-dimensional image, and
the projector changes the display distance so that a display distance of an upper part of the three-dimensional image is longer than a display distance of a lower part of the three-dimensional image.

11. The display device according to claim 1, wherein:
the image is a two-dimensional image including a first image and a second image, and
the projector changes the display distance so that a display distance of the first image is longer than a display distance of the second image.

12. A display method for a display device, wherein the display device has:
a light transmitting display medium, the display medium having a plate-shape such that a wedge angle between an outside surface and an inside surface of the medium within a predetermined height range of the display medium continuously decreases with increasing of the height of the display medium; and
a projector that projects light expressing an image onto the display medium such that the light is reflected toward a user by the display medium and changes a display distance between an eye of the user and a position of an image visually recognized as a virtual image by the user,
the display method comprising:
changing the display distance such that at an upper end of the predetermined height range, a display distance of an upper part of the image is longer than a display distance of a lower part of the same image at a lower end of the predetermined height range.

13. The display method according to claim 12, wherein:
the image is a three-dimensional image, and
in the changing, the projector changing the display distance so that a display distance of an upper part of the three-dimensional image is longer than a display distance of a lower part of the three-dimensional image.

14. The display method according to claim 12, wherein:
the image is a two-dimensional image including a first image and a second image, and
in the changing, the projector changes the display distance so that a display distance of the first image is longer than a display distance of the second image.

15. A light-transmissive display medium used in a projector, the light-transmissive display medium comprising:
a plate-shaped display, wherein:
a wedge angle between an outside surface and an inside surface of the medium within a predetermined height range of the display continuously decreases with increasing of the height of the display,
the display is configured to display light expressing an image projected by the projector such that the display reflects light toward a user,
a display distance between an eye of the user and a position of an image visually recognized as a virtual image by the user is changed by the projector, and
at an upper end of the predetermined height range, a display distance of an upper part of the image is changed by the projector to be longer than a display distance of a lower part of the same image at a lower end of the predetermined height range.

\* \* \* \* \*